United States Patent
Le Grand et al.

(10) Patent No.: US 9,419,731 B2
(45) Date of Patent: Aug. 16, 2016

(54) METHODS AND SYSTEMS FOR DETERMINING SIGNAL STRENGTH MAPS FOR WIRELESS ACCESS POINTS ROBUST TO MEASUREMENT COUNTS

(71) Applicant: Google Inc., Mountain View, CA (US)

(72) Inventors: Etienne Le Grand, Mountain View, CA (US); Brian Patrick Williams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 14/173,052

(22) Filed: Feb. 5, 2014

(65) Prior Publication Data

US 2015/0222372 A1    Aug. 6, 2015

(51) Int. Cl.
| | |
|---|---|
| *H04B 17/318* | (2015.01) |
| *H04B 17/24* | (2015.01) |
| *H04W 24/04* | (2009.01) |
| *H04W 24/08* | (2009.01) |
| *H04W 24/10* | (2009.01) |

(52) U.S. Cl.
CPC .............. *H04B 17/24* (2015.01); *H04B 17/318* (2015.01); *H04W 24/04* (2013.01); *H04W 24/08* (2013.01); *H04W 24/10* (2013.01)

(58) Field of Classification Search
CPC combination set(s) only.
See application file for complete search history.

(56) References Cited

U.S. PATENT DOCUMENTS

| 8,588,097 B1* | 11/2013 | Ogale | H04W 64/00 342/463 |
|---|---|---|---|
| 2013/0257657 A1 | 10/2013 | Garin et al. | |
| 2013/0321424 A1* | 12/2013 | Pylappan | G01C 21/20 345/440 |

FOREIGN PATENT DOCUMENTS

WO    WO 2013/146100    10/2013

OTHER PUBLICATIONS

About us / Sensorly available at http://www.sensorly.com/about-us, printed on Feb. 4, 2014.

* cited by examiner

*Primary Examiner* — Junpeng Chen
(74) *Attorney, Agent, or Firm* — McDonnell Boehnen Hulbert & Berghoff LLP (57) ABSTRACT

Examples herein include methods and systems for determining signal strength maps for wireless access points robust to measurement counts. An example method comprises receiving data related to RSSI for a wireless AP for a plurality of locations of an area, and determining an intermediary signal strength map for the wireless AP based on the received data related to the RSSI for the wireless AP. The method also includes associating the intermediary signal strength map to a regularized signal strength map for the wireless AP that is based on a diffusion mapping model of signal strength. A given partition of the regularized signal strength map is linked to one partition of the intermediary signal strength map. The method also includes providing an output signal strength map for the wireless AP including values of the regularized signal strength map modified based on values of the intermediary signal strength map.

20 Claims, 7 Drawing Sheets

INTERMEDIARY SIGNAL STRENGTH MAP

FIG. 6B

FIG. 7A (PRIOR) REGULARIZED SIGNAL
STRENGTH MAP BEFORE
INFLUENCE OF DEPICTED READINGS

FIG. 7B

FIG. 8A (OUTPUT) REGULARIZED SIGNAL
STRENGTH MAP AFTER INFLUENCE
OF DEPICTED READINGS

No REGULARIZATION
APPLIED:
MAP OVERFITS

FIG. 9C
SMOOTHING APPLIED

FIG. 9D
DIFFUSION CONSTRAINTS APPLIED

FIG. 9E

METHODS AND SYSTEMS FOR DETERMINING SIGNAL STRENGTH MAPS FOR WIRELESS ACCESS POINTS ROBUST TO MEASUREMENT COUNTS

BACKGROUND

Unless otherwise indicated herein, the materials described in this section are not prior art to the claims in this application and are not admitted to be prior art by inclusion in this section.

A location of a computing device can be determined using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. The cellular base station or an 802.11 access point may estimate an exact location. Based on the location of either the cellular base station or an 802.11 access point, the mobile computing device can calculate its exact position.

Within some instances, a localization of a mobile computing device may occur via use of data from multiple different networks. Many location based services can be provided to a mobile computing device based on determining the location of the mobile computing device.

SUMMARY

In one example, a method is provided that comprises receiving data related to received signal strength indication (RSSI) for a wireless access point (AP) for a plurality of locations of an area, and determining an intermediary signal strength map for the wireless AP based on the received data related to the RSSI for the wireless AP. The intermediary signal strength map is configured to overfit the received data based on multiple RSSI measurements linked to partitions of the intermediary signal strength map. The method also includes associating, by one or more processors, the intermediary signal strength map to a regularized signal strength map for the wireless AP, and the regularized signal strength map is based on a diffusion mapping model of signal strength for a given wireless access point and includes a plurality of partitions. A given partition of the regularized signal strength map is linked to one partition of the intermediary signal strength map. The method also includes providing an output signal strength map for the wireless AP including values of the regularized signal strength map modified based on values of the intermediary signal strength map.

In another example, a non-transitory computer readable medium or a computer readable memory having stored therein instructions, that when executed by a computing device, cause the computing device to perform functions is provided. The functions comprise receiving data related to received signal strength indication (RSSI) for a wireless access point (AP) for a plurality of locations of an area, and determining an intermediary signal strength map for the wireless AP based on the received data related to the RSSI for the wireless AP. The intermediary signal strength map is configured to overfit the received data based on multiple RSSI measurements linked to partitions of the intermediary signal strength map. The functions also comprise associating the intermediary signal strength map to a regularized signal strength map for the wireless AP, and the regularized signal strength map is based on a diffusion mapping model of signal strength for a given wireless access point and includes a plurality of partitions. A given partition of the regularized signal strength map is linked to one partition of the intermediary signal strength map. The functions also comprise providing an output signal strength map for the wireless AP including values of the regularized signal strength map modified based on values of the intermediary signal strength map.

In still another example, a system is provided that comprises one or more processors, and data storage configured to store instructions that, when executed by the one or more processors, cause the system to perform functions. The functions comprise receiving data related to received signal strength indication (RSSI) for a wireless access point (AP) for a plurality of locations of an area, and determining an intermediary signal strength map for the wireless AP based on the received data related to the RSSI for the wireless AP. The intermediary signal strength map is configured to overfit the received data based on multiple RSSI measurements linked to partitions of the intermediary signal strength map. The functions also comprise associating the intermediary signal strength map to a regularized signal strength map for the wireless AP, and the regularized signal strength map is based on a diffusion mapping model of signal strength for a given wireless access point and includes a plurality of partitions. A given partition of the regularized signal strength map is linked to one partition of the intermediary signal strength map. The functions also comprise providing an output signal strength map for the wireless AP including values of the regularized signal strength map modified based on values of the intermediary signal strength map.

In yet another example, a system is provided that comprises a means for receiving data related to received signal strength indication (RSSI) for a wireless access point (AP) for a plurality of locations of an area, and a means for determining an intermediary signal strength map for the wireless AP based on the received data related to the RSSI for the wireless AP. The intermediary signal strength map is configured to overfit the received data based on multiple RSSI measurements linked to partitions of the intermediary signal strength map. The system also includes a means for associating the intermediary signal strength map to a regularized signal strength map for the wireless AP, and the regularized signal strength map is based on a diffusion mapping model of signal strength for a given wireless access point and includes a plurality of partitions. A given partition of the regularized signal strength map is linked to one partition of the intermediary signal strength map. The system also includes a means for providing an output signal strength map for the wireless AP including values of the regularized signal strength map modified based on values of the intermediary signal strength map.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Figure 1:
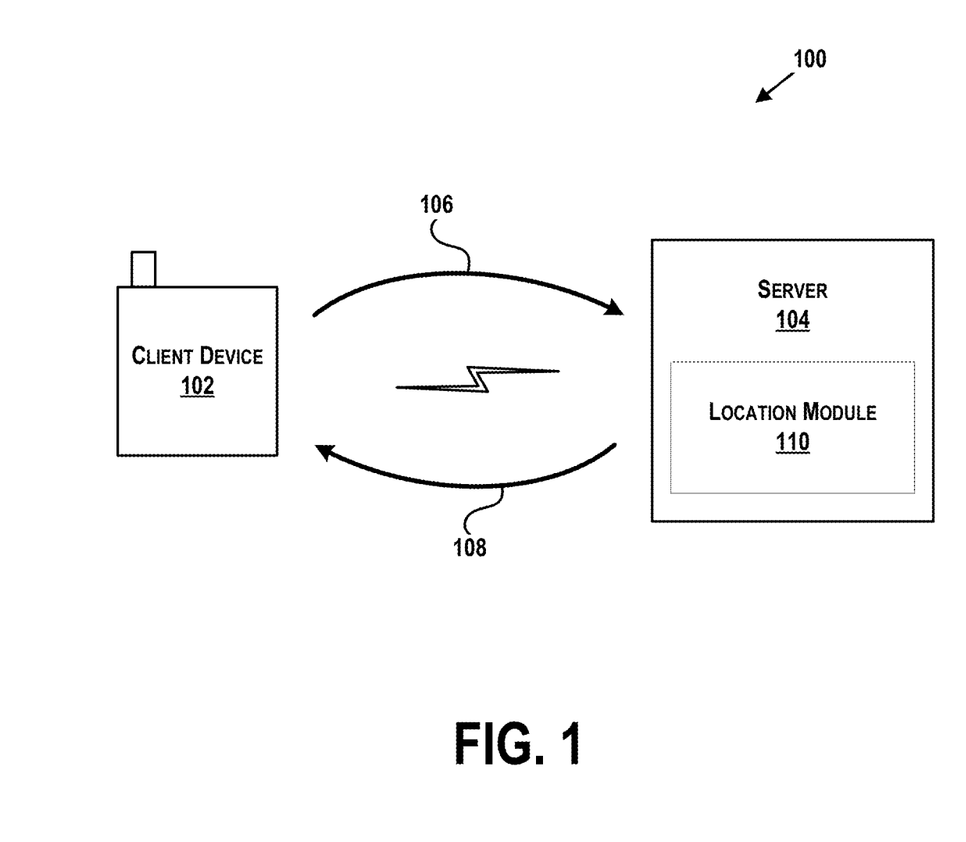
FIG. 1 illustrates an example communication system in which an example method may be implemented.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to or receive data 106 from the client device 102. The server 104 may include a location module 110 which may be configured to process the data 106 received from the client device 102 to determine a locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location, updated location history information, or information based on the locations of the device.

Figure 2:
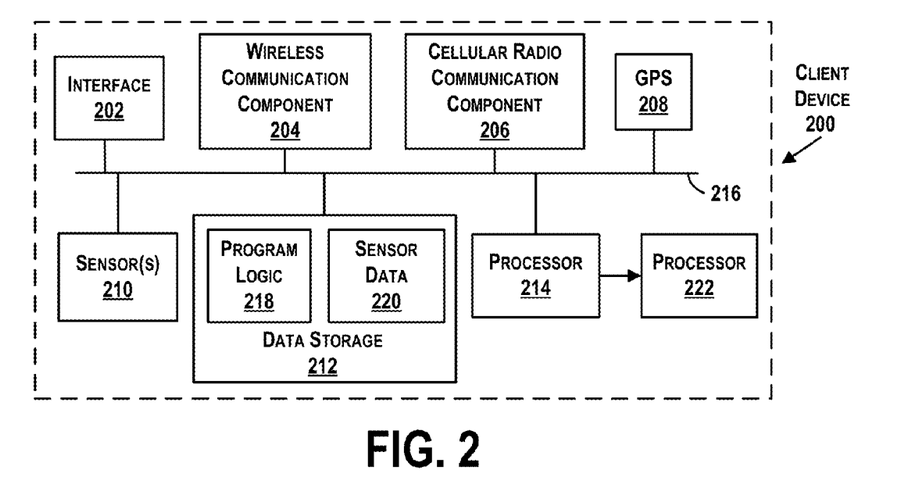
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a GPU). Example methods described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
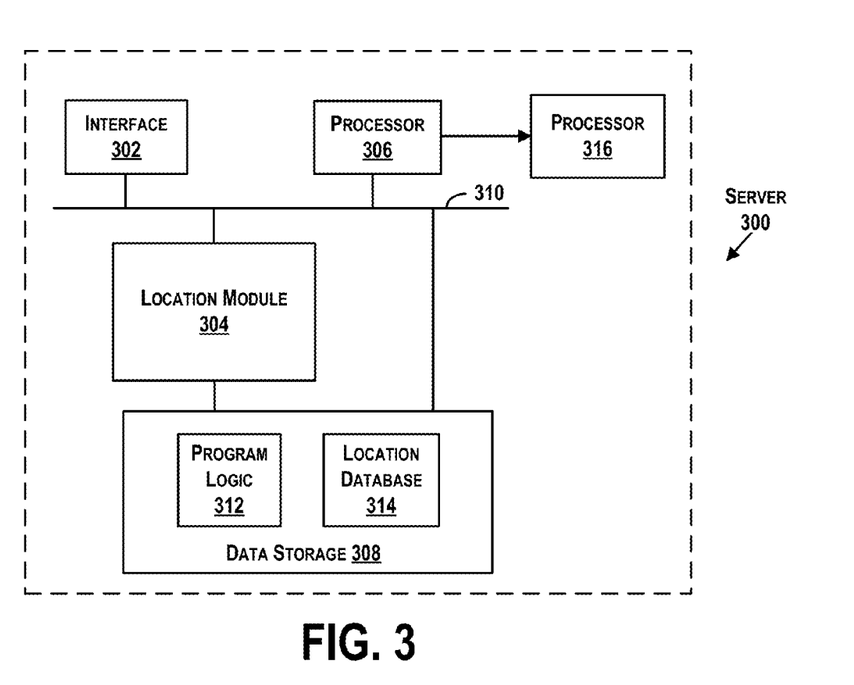
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of an accelerometer, gyroscope, or other sensors of the client device, as well as based on location determinations of the client device. The location module 304 may further be configured to determine and store a history of sensor measurements of the client device for later reprocessing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316 which may be an application specific processor for input/output functionality. In other examples, functions of the processor 306 and the processor 316 may be combined into one component.

Within examples, measurements collected from various sensors of a device (such as WiFi components, GPS sensors, and inertial sensors) can be combined with information from external databases (such as known locations of WiFi access points or building floor plans) to estimate a location or movement of the device in real-time. Recording the real-time location estimate at all times (or intervals/increments of time) may also produce a location history.

Figure 4:
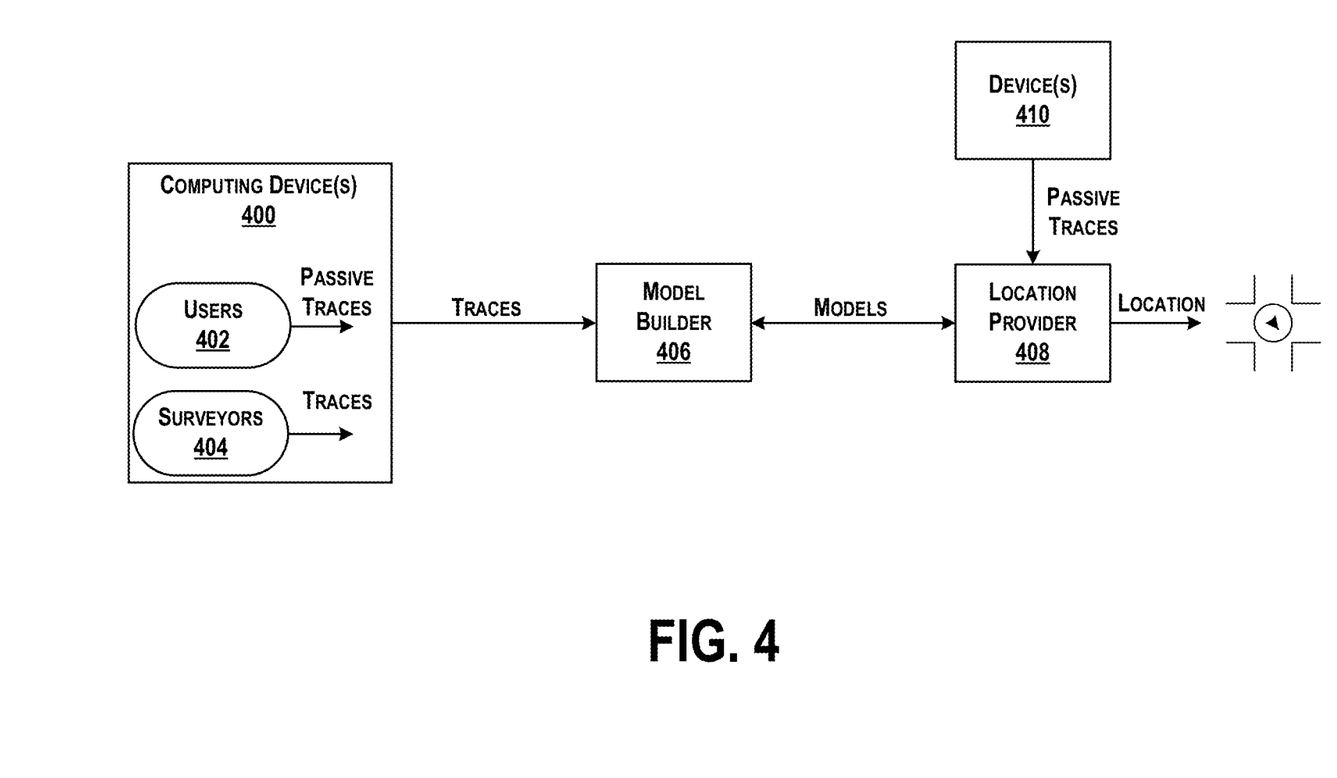
FIG. 4 is a flow diagram illustrating an example method for determining a location or movement of a device.

FIG. 4 is a flow diagram illustrating an example method for determining a location or movement of a device. Initially, computing device(s) 400, operated by users 402 or surveyors 404, may traverse areas in an environment and output traces to a model builder 406. A device operated by a user 402 may output traces passively (i.e., the device may be configured to output the trace data with no additional user input), including raw data output by sensors of the device like WiFi scans, GPS data, accelerometer data, etc. Each trace may be associated with a time the data was collected, and thus, for traces that include GPS data, other data in the traces also has location-specific references. A device operated by a surveyor 404 may have location-specific references for all traces, whether due to associated GPS data or manual input of location information.

The model builder 406 may be a module on a computing device or server, and may be configured to generate a model of the environment based on the received traces. The model builder 406 may include a trace localizer and a map builder. The model builder 406 may access reference data such as information like strength of signal (RSSI) for WiFi access points in the environment at specific locations in the environment, or other landmark data of the environment. The model builder 406 may be configured to generate a map or path of the device based on the traces. In one example, the model builder 406 may utilize GPS data to determine locations of the device over time, utilize dead reckoning (based on accelerometer and gyroscope outputs) to project a path, and optimize the path by jointly combining each. The model builder 406 may further optimize the path to match WiFi scan data to the reference WiFi maps to align a path that most likely resembles a path that the device traversed through the environment.

A location provider 408 may access a model output by the model builder 406 to determine locations of other device(s) 410 based on provided passive traces as well. Within examples, the location provider 408 may return a location of the device or an estimation of movement of the device to the device 410 based on data received in the traces.

Traces received from devices may include a variety of measurements from multiple different sensors, and may include a variety of measurements collected over time or at various locations. A trace may refer to a sensor log or a collection of data output from sensors on the device over some time period. The sensors that output data may be selected, or data to be included within the sensor log may also be selected. In some examples, a trace of data may include all data collected by a device (using a number of sensors) over a given time frame (e.g., about 5 seconds, or perhaps about 5 minutes long). Measurements in a trace or from trace to trace may be considered statistically independent. However, in instances in which the measurements are collected from positions/locations in close proximity or collected close in time, the measurements may have correlations.

Data in the received traces may be used in a graphSLAM (simultaneous localization and mapping algorithm) or similar SLAM algorithm to determine a map associated with the received data. As one example, the received traces may include RSSI for various areas associated with a WiFi access point, and a wireless signal strength map for the WiFi access point can be generated. Data from many devices can be received, and since the data may vary per device, constraints can be defined or utilized to help assign RSSI values in various partitions of the map during generation of the map or to update RSSI values of a known or given map. Within examples, solving a graph-based SLAM problem involves constructing a graph whose nodes represent poses or landmarks and in which an edge between two nodes encodes a sensor measurement that constrains the connected poses. Constraints can be contradictory since observations or measurements are received from many devices. Once the graph is constructed, a configuration of the nodes that minimizes a cost function (or error introduced by the constraints) to be maximally consistent with the measurements can be determined.

Within examples, areas can be divided into a grid including cells, and a value of an RSSI can be assigned per cell to generate a WiFi signal strength map. An RSSI map for the wireless access point may result including assigned RSSI values per the plurality of partitions based on application of the constraint. Thus, when building a map of WiFi signal strengths, data is received from many devices, and each data point is considered a constraint on the map. With more measurements, the map may overfit the data (e.g., give high weight to measurements if multiple measurements received for one area), which can result in two peak areas of strength, and a WiFi signal strength map would only have one peak at the location of the wireless AP. Usually, every measurement counts equally. However, it may be desirable to not have many measurements at one location outweigh other locations. Example SLAM algorithms often suppose that measurement noises are statistically independent. When this is not true, information can be discounted to avoid overfitting. Within examples herein, instead of discounting the information, an intermediate map is introduced between an estimated WiFi fingerprint map and the WiFi measurement map to estimate the final WiFi map with less risk of over fitting.

The intermediary map may then be linked to the regularized map with constraints making values close to one another. The intermediate map will overfit if many measurements are linked to the map, but the regularized map will not overfit because each of its cells is only linked to one cell of the intermediate map. Thus, a new layer or intermediate map is introduced where instead of measurements producing a final map, the measurements from devices produce the intermediate map and the intermediate map is used to produce the final map. The new layer is overfit using all data, and is linked with a final map.

Figure 5:
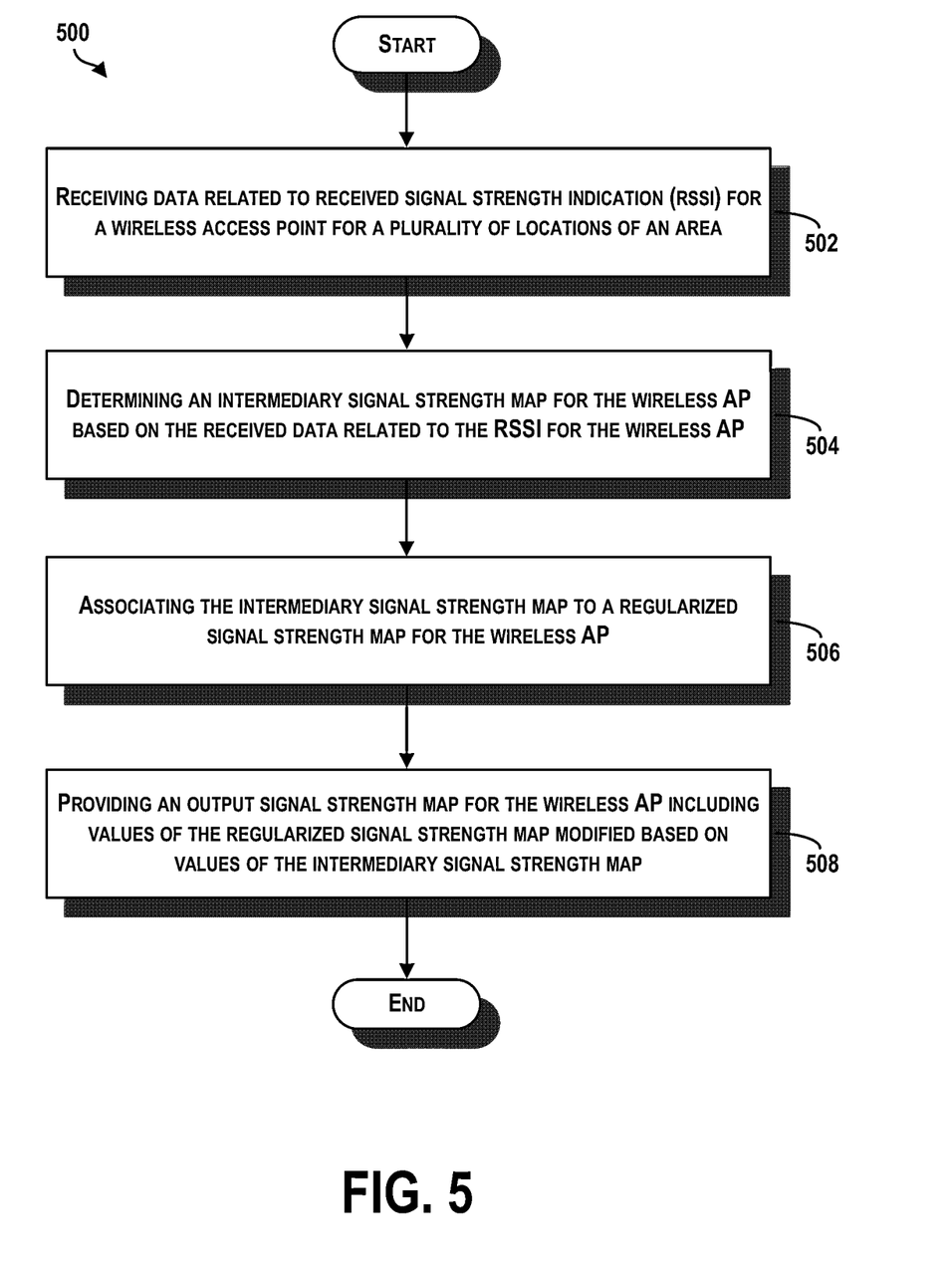
FIG. 5 is a block diagram of an example method of determining a wireless signal strength map, in accordance with at least some embodiments described herein.

FIG. 5 is a block diagram of an example method of determining a wireless signal strength map, in accordance with at least some embodiments described herein. Method 500 shown in FIG. 5 presents an embodiment of a method that, for example, could be used with the system 100 in FIG. 1, the device 200 in FIG. 2, the server 300 in FIG. 3, or the system in FIG. 4, for example, or may be performed by a combination of any components of FIGS. 1-4. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5 may represent circuitry that is wired to perform the specific logical functions in the process.

Functions of the method 500 may be fully performed by a computing device, by one or more processors of a computing device, or may be distributed across multiple computing devices and/or a server. In some examples, the computing device may receive information from sensors of the computing device, or where the computing device is a server the information can be received from another device that collects the information. The computing device could further communicate with a server to determine the matching media files, for example.

At block 502, the method 500 includes receiving data related to received signal strength indication (RSSI) for a wireless access point for a plurality of locations of an area. In some examples, the data may include scans of a WiFi access point collected from the area, and the data may further include a WiFi access point identifier. The data may be included within a trace of data or log of data received from a device, or logs of data received from multiple devices and other data may be provided as well. As examples, any data output by sensors such as an accelerometer, a gyroscope, a WiFi transceiver, a GPS module, a magnetometer, a barometer, and a Bluetooth transceiver, may be received. The data may be collected by sensors of the devices over a plurality of locations and over time periods.

The data may be used to estimate a position of the WiFi access point as well as signal strength of the WiFi access point at various areas near and around the WiFi access point to generate a fingerprint map specific for the WiFi access point. In other examples in which the data is representative of Bluetooth wireless signals or other wireless radio frequency signals, the data may be used to estimate signal strength of a source of the wireless signals.

A number of traces may be received from many devices, and may be arranged per WiFi access point identifier so as to associate all WiFi data per access point.

At block 504, the method 500 includes determining an intermediary signal strength map for the wireless AP based on the received data related to the RSSI for the wireless AP. The intermediary signal strength map is configured to overfit the received data based on multiple RSSI measurements linked to partitions of the intermediary signal strength map. For example, the intermediary signal strength map overfits the received data by correlating a magnitude of an RSSI value to a given partition based on a number of RSSI measurements linked to the given partition, and in some instances multiple RSSI measurements are linked to the same partition of the intermediary signal strength map.

Figure 6A:
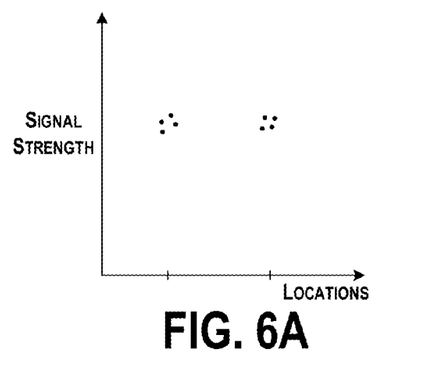
FIG. 6A is an example graph of received RSSI per location.
Figure 6B:
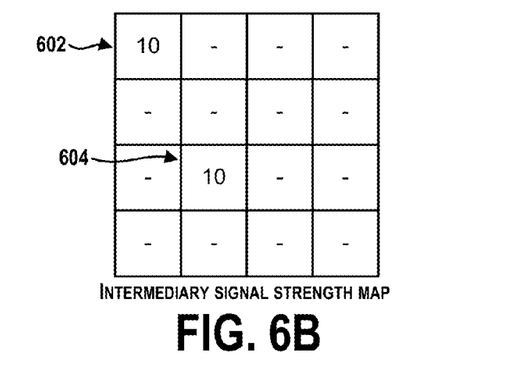
FIG. 6B is an example intermediary signal strength map.

FIG. 6A is an example graph of received RSSI per location. The graph indicates that eight different sets of RSSI data were received for respective locations, and each is about the same in signal strength. FIG. 6B is an example intermediary signal strength map. The intermediary signal strength map is divided into sixteen different cells or partitions. The received RSSI data maps to two different partitions 602 and 604. In this example, each of the two partitions has four different RSSI measurements associated with the partition, and values of the RSSI measurements are used to determine an RSSI value for each specific partition. In this example, the measurements of the RSSI may be correlated to a value of 10 for each measurement, as shown in the intermediary signal strength map in FIG. 6B. The value of 10 may be conceptual or a unit value that corresponds to a specific RSSI measurement value, for example.

In FIG. 6B, each received data related to RSSI is associated with a given partition of the intermediary map and is considered equally for determination of the given RSSI value for the given partition. Thus, more RSSI data received for a given location or partition may overly influence values of RSSI assigned to the partition, and the map may be considered to overfit the data. However, RSSI values for partitions of the intermediary signal strength map are determined based on the received data such that multiple RSSI measurements result in determination of a given RSSI value for a given partition, which in the example in FIG. 6B is a value of 10 for each partition.

The partitions of the intermediary signal strength map for the wireless AP may be aligned to position coordinates based on received GPS positioning data.

Referring back to FIG. 5, at block 506, the method 500 includes associating the intermediary signal strength map to a regularized signal strength map for the wireless AP. The regularized signal strength map is based on a diffusion mapping model of signal strength for a given wireless access point and includes a plurality of partitions. The regularized signal strength map includes assigned RSSI values to partitions based on prior RSSI measurements for the wireless AP. In some examples, the regularized signal strength map includes a single partition with a peak RSSI value and RSSI values within surrounding partitions decrease in value to provide a diffusion map.

Figure 7A:
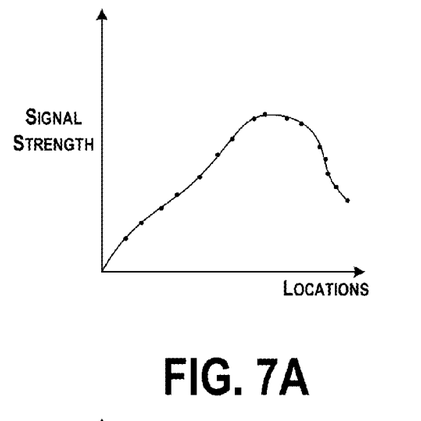
FIG. 7A is an example graph of prior received or measured RSSI per location.
Figure 7B:
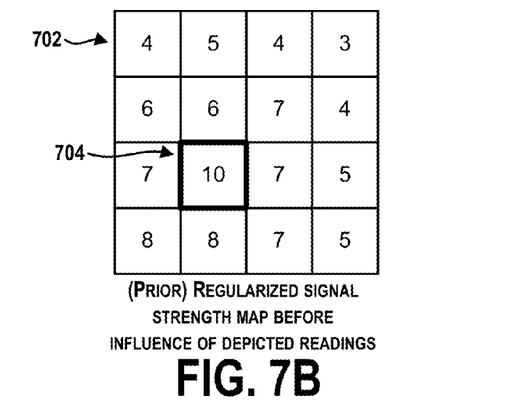
FIG. 7B is an example regularized signal strength map.

FIG. 7A is an example graph of prior received or measured RSSI per location. The graph indicates that a number of different sets of RSSI data have been received for respective locations, and each varies in signal strength. FIG. 7B is an example regularized signal strength map. The regularized signal strength map and the intermediary signal strength map have a same set of partitions that relate to the same locations, and partitions in the set of partitions for each of the regularized signal strength map and the intermediary signal strength map are associated with an RSSI value for the wireless AP. In FIG. 7B, RSSI values for each partition are provided based on the prior received or measured signal strengths for those partitions. As shown, there is one partition 704 that has a peak value of 10, and partitions surrounding have RSSI values that decrease in value based on distance from the peak partition. The peak partition may be indicative of a location of the wireless AP. Since the wireless AP is only present in one location, it is expected to have one partition with a peak signal strength, and other partitions have a signal strength of lower values.

Thus, the map in FIG. 7B for the wireless access point includes a single local maximum RSSI value indicative of the location of the wireless access point, and indications of a diffusion of signal strength over the area away from the location of the wireless access point. Thus, the RSSI degrades as the distance away from the WiFi access point increases.

Referring back to block 506, the function of associating the intermediary signal strength map to a regularized signal strength map for the wireless AP includes linking a given partition of the regularized signal strength map to one partition of the intermediary signal strength map. At block 508, the method 500 includes providing an output signal strength map for the wireless AP including values of the regularized signal strength map modified based on values of the intermediary signal strength map.

Within examples, the given partition of the regularized signal strength map is linked to the one partition of the intermediary signal strength map so as to cause an RSSI value for the given partition of the regularized signal strength map to be modified in magnitude closer in value to an RSSI value of the one partition of the intermediary signal strength map.

Figure 8A:
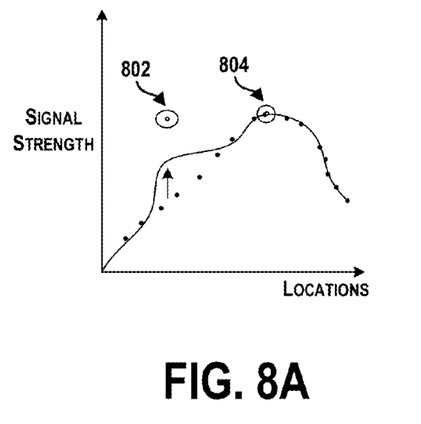
FIG. 8A is an example graph of RSSI data combined from FIG. 6A and FIG. 7A.

FIG. 8A is an example graph of RSSI data combined from FIG. 6A and FIG. 7A. The graph indicates that a first set of received data at location 802 from the currently received RSSI data has a higher signal strength than that of the prior received data for the regularized signal strength map. Thus, the data at location 802 will cause the graph to include in value for that location. The graph also shows that the currently received data at location 804 has a signal strength of about the same as the prior signal strength, and thus, does not cause the graph to change values at location 804.

Figure 8B:
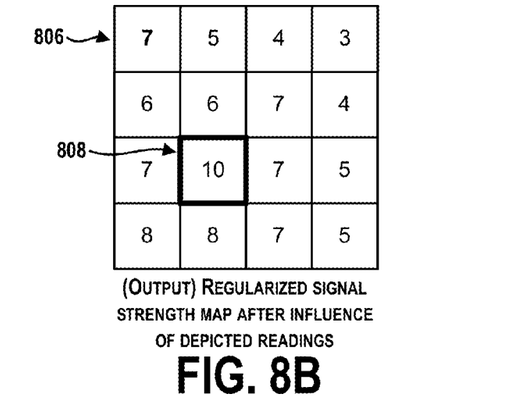
FIG. 8B is an example output signal strength map.

FIG. 8B is an example output signal strength map. Each partition of the regularized signal strength map is linked to the corresponding partition for the same location in the intermediary signal strength map, and the linking causes values of the regularized signal strength map to be modified. In FIG. 8B, partition 806 results from linking partition 602 with partition 702 in FIG. 6B and FIG. 7B, and partition 808 results from linking partition 604 with partition 704 in FIG. 6B and FIG. 7B. With respect to partitions 604 and 704, the values are the same, and thus, no change results in the RSSI value assigned to that partition (e.g., partition 808) in the output signal strength map.

With respect to partitions 602 and 702, the values are different. The value of partition 602 is higher than the value of partition 702, and will cause an RSSI value of the corresponding partition (e.g., partition 806) in the output signal strength map to increase in value. In this example, as shown, the value in the intermediary signal strength map is 10, and the value in the regularized signal strength map is 4, and the value in the output signal strength map is an average of each.

In other examples, the partitions of the regularized signal strength map may be linked to corresponding partitions of the intermediary signal strength map through a constraint in a cost function. The constraint may be defined as $$\frac{(a-b)^2}{std^2}$$

where a is an RSSI value of the given partition in the regularized signal strength map, b is an RSSI value of the corresponding partition of the intermediary signal strength map, and std is a predetermined standard deviation in RSSI values. In some examples, the standard deviation is an empirically determined standard deviation determined based on prior measurements and observations or RSSI values and changes to RSSI values over time.

In one example, the constraint may be applied to the RSSI values using a non-linear least squares solver, after formulating each constraint, as a contributor to a cost function that is being minimized, for example. The constraint may thus indicate to increase or decrease the RSSI values. The constraints may be utilized or applied in the graphSLAM or similar SLAM algorithms.

In some examples, the cost function may comprise terms for dead reckoning, RSSI-based distance estimation from AP position to user locations, orientation of the user based on magnetometer, map diffusion and smoothing, user strength measurement to map strength values, GPS measurements, highest RSSI constraints, biases constraints, and others. The cost function may take the form of $F$=dead_reckoning_cost+GPS_cost+measured_strengths_to_intermediate_map_cost+intermediate_map_to_regularized_map_cost+map_regularization_cost+ . . . .

The cost function may contain more or fewer terms based on data available. In further examples, the cost function may be minimized using a non-linear least squares optimization to determine updates to RSSI values of partitions in the regularized signal strength map.

Within examples, using the method 500 in FIG. 5 results in determining the intermediary signal strength map based on all received data to derive an RSSI value for a partition. Following, the RSSI values for partitions are linked to corresponding partitions in a prior regularized map to determine modifications to the prior regularized map. In this way, while data may be overfit on the intermediary signal strength map, the data will not overfit the regularized map and will not overly influence RSSI values for any given partition. The method 500 may be considered to cause down-weighting of multiple received RSSI data that is associated with the one partition of the intermediary signal strength map, since even though many measurements may be received for a partition, those measurements are transformed into a single RSSI value for consideration.

Figure 9A:
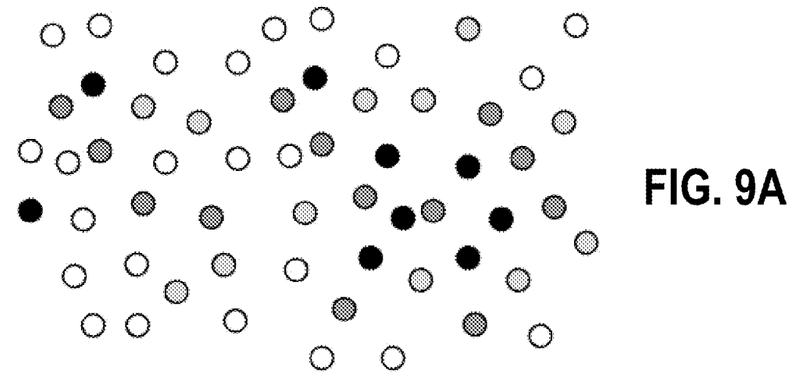
FIG. 9A is a conceptual illustration of received measurements within an area.

FIG. 9A is a conceptual illustration of received measurements within an area. Darker measurements indicate stronger measurements. These are readings used to create a map.

Figure 9B:
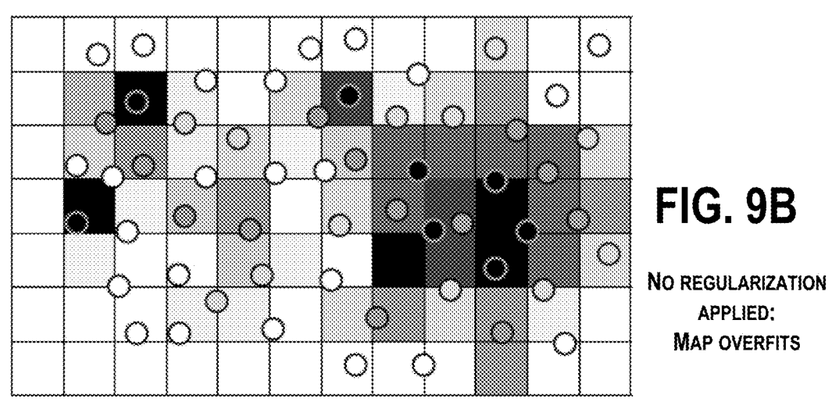
FIGS. 9B-9E are example diagrams of an area for a wireless signal strength map.

FIG. 9B is another example diagram of an area for a wireless signal strength map. In FIG. 9B, a map is generated based on the received data shown in FIG. 9A as collected from the area. Darker shades are representative of higher RSSI values collected. As shown on the map, no regularization is applied, and the values in the partitions overfit the data. for example, there are multiple areas in the map that indicate strong signal strength, when it is expected that there would only be one peak signal strength at the location of the wireless AP.

Figure 9C:
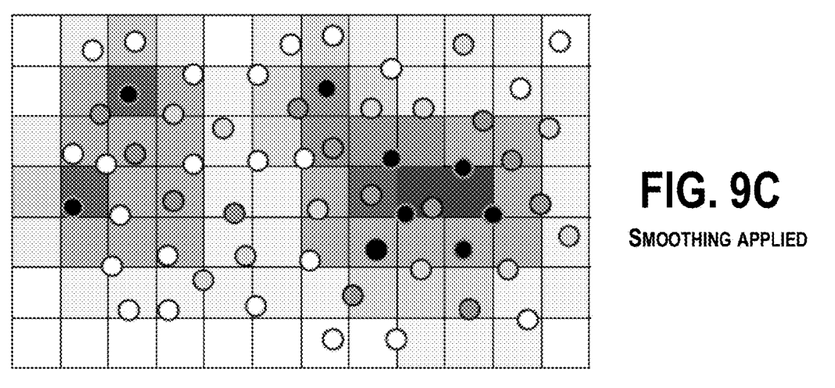

FIG. 9C is another example diagram of the area for the wireless signal strength map. In FIG. 9C, smoothing is applied, and the indication of signal strengths is smoother as expected for a diffusion based signal model. However, there are still multiple maximum or peak signal strength areas.

Figure 9D:
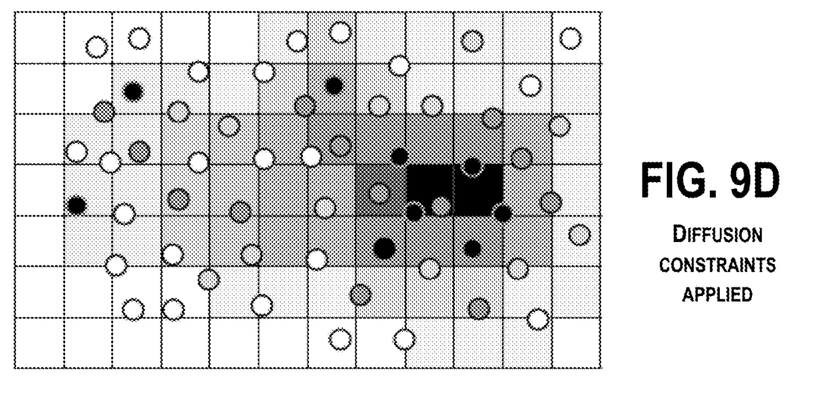

FIG. 9D is another example diagram of the area for the wireless signal strength map. In FIG. 9D, regularization is added such that values of neighboring cells are constrained to be similar, and a single maximum partition or area (in which two neighboring partitions are maximum) remains. The map in FIG. 9D may capture the fact RSSI field is somewhat smooth and that two neighboring cells should have similar RSSI values. Applying four conceptual constraints (or springs) per cell, results in the map having one general area with high RSSI values shown shaded dark, and values degrade as the distance from the WiFi access point increases. Such a map can be generated using smoothing constraints to require that a cell's RSSI is lower than (or equal to) a highest RSSI of its neighbors to simulate diffusion of the signal.

Figure 9E:
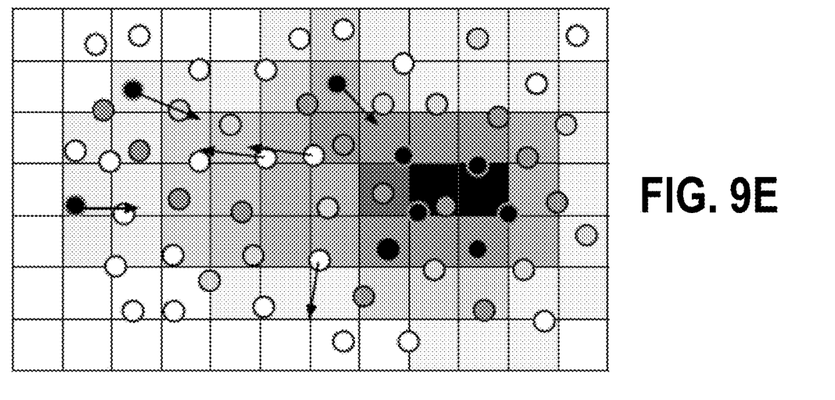

FIG. 9E is yet another example diagram of an area for a wireless signal strength map. In FIG. 9E, generally, measurements that do not agree with the regularized map are pushed towards areas where the measurements do agree. The regularization prevents the measurements from only agreeing with the map where they are positioned. FIG. 9E illustrates how the map is modified during regularization. After applying the method 500 in FIG. 5 and adding the diffusion constraint, the map is caused to have a single maximum and localization of the traces is improves resulting in a modified map. The iterative process applies constraints and other outer areas surrounding the hotspot (i.e., the WiFi access point location) may have values lowered to be within the constraint.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving data related to received signal strength indication (RSSI) for a wireless access point (AP) for a plurality of locations of an area;
   determining an intermediary signal strength map for the wireless AP based on the received data related to the RSSI for the wireless AP, wherein the intermediary signal strength map is configured to overfit the received data based on multiple RSSI measurements linked to partitions of the intermediary signal strength map;
   associating, by one or more processors, the intermediary signal strength map to a regularized signal strength map for the wireless AP, wherein the regularized signal strength map is based on a diffusion mapping model of signal strength for a given wireless access point and includes a plurality of partitions, wherein a given partition of the regularized signal strength map is linked to one partition of the intermediary signal strength map; and
   providing an output signal strength map for the wireless AP including values of the regularized signal strength map modified based on values of the intermediary signal strength map.

2. The method of claim 1, wherein the intermediary signal strength map overfits the received data correlating a magnitude of an RSSI value to a given partition based on a number of RSSI measurements linked to the given partition.

3. The method of claim 1, wherein the intermediary signal strength map overfits the received data based on multiple RSSI measurements linked to the same partition of the intermediary signal strength map.

4. The method of claim 1, wherein receiving the data related to RSSI for the wireless AP comprises receiving logs of data from devices, wherein respective data is collected by sensors of the devices over a plurality of locations and over time periods, and wherein a respective log of data includes one or more of GPS positioning data, the RSSI for the wireless AP, accelerometer data, and gyroscope data.

5. The method of claim 4, further comprising determining the intermediary signal strength map for the wireless AP aligned to position coordinates based on the GPS positioning data.

6. The method of claim 1, wherein the regularized signal strength map includes assigned RSSI values to partitions based on prior RSSI measurements for the wireless AP.

7. The method of claim 1, wherein the regularized signal strength map based on the diffusion mapping model includes a single partition with a peak RSSI value and RSSI values within surrounding partitions decrease in value.

8. The method of claim 1, wherein the regularized signal strength map and the intermediary signal strength map comprise a same set of partitions, and wherein partitions in the set of partitions for each of the regularized signal strength map and the intermediary signal strength map are associated with an RSSI value for the wireless AP, wherein RSSI values for partitions of the intermediary signal strength map are determined based on the received data such that multiple RSSI measurements result in determination of a given RSSI value for a given partition.

9. The method of claim 8, wherein each received data related to RSSI is associated with a given partition of the intermediary map and is considered equally for determination of the given RSSI value for the given partition.

10. The method of claim 8, wherein the given partition of the regularized signal strength map is linked to the one partition of the intermediary signal strength map so as to cause an RSSI value for the given partition of the regularized signal strength map to be modified in magnitude closer in value to an RSSI value of the one partition of the intermediary signal strength map.

11. The method of claim 10, wherein linking the given partition of the regularized signal strength map to the one partition of the intermediary signal strength map causes down-weighting of multiple received RSSI data that is associated with the one partition of the intermediary signal strength map.

12. The method of claim 8, wherein associating the intermediary signal strength map to the regularized signal strength map for the wireless AP comprises linking the given partition of the regularized signal strength map to the one partition of the intermediary signal strength map through a constraint in a cost function, wherein the constraint includes $$\frac{(a-b)^2}{std^2}$$

where a is an RSSI value of the given partition in the regularized signal strength map, b is an RSSI value of the one partition of the intermediary signal strength map, and std is a predetermined standard deviation in RSSI values.

13. The method of claim 12, further comprising minimizing the cost function using a non-linear least squares optimization to determine updates to RSSI values of partitions in the regularized signal strength map.

14. A computer readable memory having stored therein instructions, that when executed by one or more processors, cause the one or more processors to perform functions comprising:
   receiving data related to received signal strength indication (RSSI) for a wireless access point (AP) for a plurality of locations of an area;
   determining an intermediary signal strength map for the wireless AP based on the received data related to the RSSI for the wireless AP, wherein the intermediary signal strength map is configured to overfit the received data based on multiple RSSI measurements linked to partitions of the intermediary signal strength map;

associating the intermediary signal strength map to a regularized signal strength map for the wireless AP, wherein the regularized signal strength map is based on a diffusion mapping model of signal strength for a given wireless access point and includes a plurality of partitions, wherein a given partition of the regularized signal strength map is linked to one partition of the intermediary signal strength map; and providing an output signal strength map for the wireless AP including values of the regularized signal strength map modified based on values of the intermediary signal strength map.

15. The computer readable memory of claim 14, wherein the intermediary signal strength map overfits the received data based on multiple RSSI measurements linked to the same partition of the intermediary signal strength map.

16. The computer readable memory of claim 14, wherein receiving the data related to RSSI for the wireless AP comprises receiving logs of data from devices, wherein respective data is collected by sensors of the devices over a plurality of locations and over time periods, and wherein a respective log of data includes one or more of GPS positioning data, the RSSI for the wireless AP, accelerometer data, and gyroscope data, and wherein the functions further comprise:

determining the intermediary signal strength map for the wireless AP aligned to position coordinates based on the GPS positioning data.

17. The computer readable memory of claim 14, wherein the regularized signal strength map includes assigned RSSI values to partitions based on prior RSSI measurements for the wireless AP, and wherein the regularized signal strength map based on the diffusion mapping model includes a single partition with a peak RSSI value and RSSI values within surrounding partitions decrease in value.

18. A system comprising:
one or more processors;
data storage configured to store instructions that, when executed by the one or more processors, cause the system to perform functions comprising:

receiving data related to received signal strength indication (RSSI) for a wireless access point (AP) for a plurality of locations of an area;

determining an intermediary signal strength map for the wireless AP based on the received data related to the RSSI for the wireless AP, wherein the intermediary signal strength map is configured to overfit the received data based on multiple RSSI measurements linked to partitions of the intermediary signal strength map;

associating the intermediary signal strength map to a regularized signal strength map for the wireless AP, wherein the regularized signal strength map is based on a diffusion mapping model of signal strength for a given wireless access point and includes a plurality of partitions, wherein a given partition of the regularized signal strength map is linked to one partition of the intermediary signal strength map; and providing an output signal strength map for the wireless AP including values of the regularized signal strength map modified based on values of the intermediary signal strength map.

19. The system of claim 18, wherein the regularized signal strength map and the intermediary signal strength map comprise a same set of partitions, and wherein partitions in the set of partitions for each of the regularized signal strength map and the intermediary signal strength map are associated with an RSSI value for the wireless AP, wherein RSSI values for partitions of the intermediary signal strength map are determined based on the received data such that multiple RSSI measurements result in determination of a given RSSI value for a given partition.

20. The system of claim 19, wherein the given partition of the regularized signal strength map is linked to the one partition of the intermediary signal strength map so as to cause an RSSI value for the given partition of the regularized signal strength map to be modified in magnitude closer in value to an RSSI value of the one partition of the intermediary signal strength map, and wherein linking the given partition of the regularized signal strength map to the one partition of the intermediary signal strength map causes down-weighting of multiple received RSSI data that is associated with the one partition of the intermediary signal strength map.

* * * * *